United States Patent
Hwang et al.

(10) Patent No.: US 7,161,468 B2
(45) Date of Patent: Jan. 9, 2007

(54) USER AUTHENTICATION METHOD AND APPARATUS

(75) Inventors: Eui-hyeon Hwang, Gyeonggi-do (KR); Jong-ha Lee, Gyeonggi-do (KR)

(73) Assignee: Samsung Electronicss Co., Ltd., Suwon-Si (KR)

(*) Notice: Subject to any disclaimer, the term of this patent is extended or adjusted under 35 U.S.C. 154(b) by 422 days.

(21) Appl. No.: 10/760,556

(22) Filed: Jan. 21, 2004

(65) Prior Publication Data

US 2004/0164848 A1 Aug. 26, 2004

(30) Foreign Application Priority Data

Jan. 21, 2003 (KR) .................... 10-2003-0004103

(51) Int. Cl.
*H04Q 9/00* (2006.01)
*G05B 19/00* (2006.01)

(52) U.S. Cl. .................. 340/5.82; 340/5.85; 340/5.52; 340/5.81

(58) Field of Classification Search ............ 340/5.82, 340/5.85, 5.52, 5.81
See application file for complete search history.

(56) References Cited

U.S. PATENT DOCUMENTS

| | | | |
|---|---|---|---|
| 5,386,104 A * | 1/1995 | Sime | 235/379 |
| 5,933,515 A * | 8/1999 | Pu et al. | 382/124 |
| 6,938,159 B1 * | 8/2005 | O'Connor et al. | 713/186 |
| 6,980,672 B1 * | 12/2005 | Saito et al. | 382/124 |
| 7,039,812 B1 * | 5/2006 | Kawan et al. | 713/186 |
| 2001/0036297 A1 | 11/2001 | Ikegami et al. | |
| 2002/0184538 A1 | 12/2002 | Sugimura et al. | |

FOREIGN PATENT DOCUMENTS

| | | |
|---|---|---|
| KR | 2001-7874 | 2/2001 |
| KR | 2001-8753 | 2/2001 |
| KR | 2001-73910 | 8/2001 |
| KR | 2001-95788 | 11/2001 |
| KR | 2002-75530 | 10/2002 |
| KR | 2003-30083 | 4/2003 |

OTHER PUBLICATIONS

European Search Report for Application No. 04250300.3—2212 dated Dec. 30, 2005.
Office Action issued by the Korean Patent Office on Mar. 25, 2005 in Application No. 10-2003-0004103.

* cited by examiner

*Primary Examiner*—Jeffery Hofsass
*Assistant Examiner*—Scott Au
(74) *Attorney, Agent, or Firm*—Staas & Halsey LLP (57) ABSTRACT

A user authentication method and apparatus including determining whether a password has been input; setting a first threshold value if the input password matches with a registered password and setting a second threshold value if the input password does not match with the registered password; and determining whether to authenticate the user or not based on a comparison of the user's biometrics information with registered biometrics information and the first or second threshold value.

32 Claims, 6 Drawing Sheets

USER AUTHENTICATION METHOD AND APPARATUS

CROSS-REFERENCE TO RELATED APPLICATIONS

This application claims the priority of Korean Patent Application No. 2003-4103, filed on Jan. 21, 2003, in the Korean Intellectual Property Office, the disclosure of which is incorporated herein in its entirety by reference.

BACKGROUND OF THE INVENTION

1. Field of the Invention

The present invention relates to user authentication, and more particularly, to user authentication adopting a combination of password authentication and biometrics.

2. Description of the Related Art

Hereinafter, conventional user authentication techniques adopting a combination of password authentication and biometrics will be described in the following paragraphs.

Korean Patent Application No. 2000-19152 entitled "Portable Security Authentication Apparatus and System and Operating Method Thereof" discloses a user authentication method based on a sequential combination of biometrics, such as fingerprint or voice recognition, and password authentication.

Korean Patent Application No. 2000-3099 entitled "Door Lock/Unlock System Adopting Combination of Fingerprint Authentication and Password Authentication and Method of Controlling the Same" discloses a user authentication technique in which a user whose fingerprint cannot be registered and a visitor whose fingerprint has not yet been registered can be authenticated by inputting a password.

Korean Patent Application No. 2000-60312 entitled "Entrance/Exit Control System and Method Adopting Fingerprint and Face Recognition" discloses a user authentication technique in which a user can be authenticated through a combination of fingerprint and face recognition or through a combination of password authentication, and fingerprint and face recognition. In this user authentication technique, security can be guaranteed by storing a fingerprint and face image of an unauthenticated person.

Korean Patent Application Nos. 2001-15559 and 1999-26726 disclose a door opening and shutting system based on fingerprint recognition and a method of recognizing a password of a mobile phone through voice recognition, respectively.

The above-described conventional user authentication techniques carry out a plurality of user authentication processes based on a simple combination of a password and biometrics information or a simple combination of a security key and biometrics information.

The performance of a conventional biometrics device that authenticates a user using, for example, a face, a fingerprint, and/or an iris, as an authentication key may be deteriorated because the authentication key is likely to be input into the conventional biometrics device differently all the time depending on where and how a user uses the conventional biometrics device, or because the authentication key is also likely to vary itself according to the passage of time.

In the case of using a key, a password, an integrated circuit (IC) card, or a radio frequency (RF) card, an authentication result represented by a binary code "0" or "1" is obtained in response to the reception of an authentication key. On the other hand, in the case of using a biometrics device, an authentication result can be represented by a value between "0" and "1" depending on the performance of an authentication device and the extent to which an input authentication key matches with registered data. Therefore, there is a need to additionally set an authentication threshold value for differentiating a refusal (0) from an authentication (1). If the authentication threshold value is set high, the possibility of a non-registered person being accepted decreases, but the possibility of a registered person being rejected increases. Therefore, the registered person may not be authenticated, which is called a false rejection (FR), or the non-registered person may be authenticated instead, which is called a false acceptance (FA).

SUMMARY OF THE INVENTION

The present invention provides a user authentication method which is capable of reducing a false acceptance rate (FAR) and a false rejection rate (FRR) by adopting a combination of password authentication and biometrics.

The present invention also provides a user authentication apparatus that carries out the user authentication method.

Additional aspects and/or advantages of the invention will be set forth in part in the description which follows and, in part, will be obvious from the description, or may be learned by practice of the invention.

According to an aspect of the present invention, a user authentication method authenticates a user based on a password input by the user and the user's biometrics information. The user authentication method includes determining whether a password has been input; setting a first threshold value if the input password matches with a registered password and setting a second threshold value if the input password does not match with the registered password; and determining whether to authenticate the user or not based on a comparison of the user's biometrics information with registered biometrics information and the first or second threshold value.

According to another aspect of the present invention, a user authentication apparatus authenticates a user based on a password input by the user and the user's biometrics information. The user authentication apparatus includes a password input unit which determines whether a password has been input; a storage unit which stores a registered password and registered biometrics; a threshold value setting unit which sets a first threshold value if the input password matches with a registered password and sets a second threshold value if the input password does not match with the registered password; and a biometrics unit which obtains biometrics information from the outside, determines how much the obtained biometrics information matches with registered biometrics information, and authenticates a user if the extent to which the obtained biometrics information matches with registered biometrics information is larger than the first or second threshold value.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention relates to a user authentication method that authenticates a user using a combination of password authentication and biometrics, such as a fingerprint, iris, or face recognition. A password may be input into a user authentication apparatus according to the present invention via a key input device, such as number buttons or a touch panel provided to a terminal, or other input devices.

In the present invention, two authentication indexes for biometrics, i.e., a false acceptance rate (FAR) and a false rejection rate (FRR) are considered. FAR indicates the probability of an intruder being authenticated, and FRR indicates the probability of a registered person or an authorized user not being authenticated. In other words, these two authentication indexes all indicate the possibility of authentication failures. If FAR is reduced, the possibility of an intruder being authenticated decreases so that security can be enhanced. On the other hand, if FRR is reduced, the possibility of a registered person being rejected decreases so that the registered person's convenience can be enhanced. The performance of a biometrics device may be varied by adjusting a threshold value. In the adjustment of the threshold value, FAR and FRR vary inversely with respect to each other.

A user authentication method according to the present invention may be implemented to control an attempt to access a personal computer, an unauthorized use of a personal mobile terminal, an attempt to access an Internet service, and an entrance to/exit from a security facility.

Figure 1:
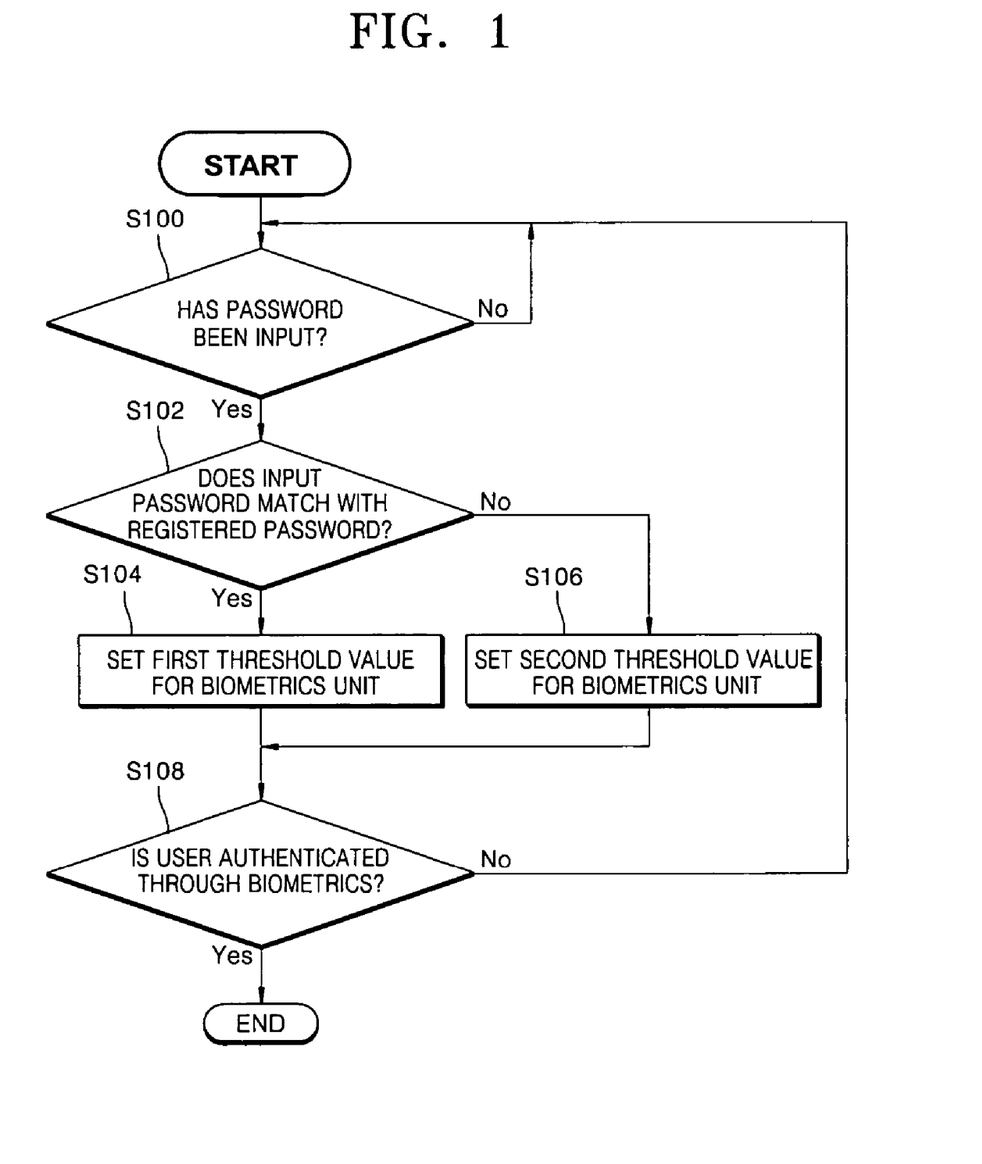
FIG. 1 is a flowchart of a user authentication method according to an embodiment of the present invention.

FIG. 1 is a flowchart of a user authentication method according to an embodiment of the present invention. The user authentication method involves operations S100 through S108 in which a user is authenticated by varying a threshold value of a biometrics device depending on whether a password input by a user matches with a registered password.

The biometrics device adjusts a level of security depending on the extent to which input biometrics information matches with registered biometrics information. In other words, if the extent to which the biometrics information obtained from the user matches with the registered biometrics information is larger than a predetermined threshold value, the biometrics device authenticates the user. Otherwise, the biometrics device rejects the user. If the threshold value is set too high in order to block an intruder, an authorized user may also be rejected. On the other hand, if the threshold value is set too low in order to facilitate the authorized user's access, the intruder may also be accepted. In other words, if FRR is reduced in order to maximize the authorized user's convenience, FAR increases. If FAR is reduced in order to prevent an intrusion, FRR increases.

In the present invention, two different threshold values are respectively used for an occasion when an input password matches with a registered password and another occasion when the input password does not match with the registered password. If a user inputs a correct password in a desired manner, a threshold value is reduced so that FRR can decrease, thus maximizing an authorized user's convenience. On the other hand, if the user inputs a wrong password, the threshold value is adjusted so that a level of security can be enhanced to prevent an intrusion. The user authentication method according to an embodiment of the present invention will be described in greater detail in the following paragraphs.

In operation S100, the method waits for a password to be input by a user. In order for a biometrics device to carry out operation S100, the biometrics device may include a display unit that displays a message requiring the user to input a password.

In operation S102, the input password is compared with a registered password to determine if a valid password, corresponding to a match between the input password and the registered password, has been entered.

In operation S104, if the input password matches with the registered password, a first threshold value is assigned to a threshold value so that FRR can be reduced.

In operation S106, if the input password does not match with the registered password, a second threshold value is assigned to a threshold value so that FAR can be reduced.

In operation S108, it is determined whether or not the user is authenticated by the biometrics device for which the first or second threshold values have already been set, and the user authentication method returns to operation S100 if the user is not authenticated.

The following table shows the variation of FAR and FRR with respect to the variation of the threshold value, which will make the user authentication method of FIG. 1 become more apparent.

TABLE 1

| FAR (%) | 0.00 | 0.01 | 0.10 | 0.20 | 0.50 | 1.00 | 2.00 |
|---|---|---|---|---|---|---|---|
| FRR (%) | 41.48 | 26.25 | 17.41 | 15.28 | 10.42 | 8.24 | 6.43 |

As shown in Table 1, when FAR is low, FRR is high. On the other hand, when FRR is low, FAR is high. However, in authenticating a user, the threshold of both the FAR and FRR are kept very low.

Supposing that a key manipulation unit of a personal digital assistant (PDA) has 10 buttons and a password is comprised of a one-digit number, the user authentication method of FIG. 1 will be described in greater detail in the following paragraphs.

If a user inputs a correct password, (1.00%, 8.24%) is used as one threshold value of FAR and FRR. Otherwise, (0.10%, 17.41%) is used as another threshold value of FAR and FRR. Because the key manipulation unit in this example has 10 buttons, let us assume that the probability of an intruder inputting a correct password in a first trial is 10% (=0.1), the probability of the intruder inputting a wrong password in the first trial is 90% (=0.9), the probability of a registered user inputting a correct password in a first trial is 100%, and the probability of the registered user inputting a wrong password in the first trial is 0%. Then, FRR and FAR can be calculated using Equation (1) below.

$$FRR = 1.0 \times 8.24 + 0.0 \times 17.41 = 8.24(\%) \quad FAR = 0.1 \times 1.00 + 0.9 \times 0.10 = 0.19(\%) \quad (1)$$

Therefore, by using the two threshold values of FAR and FRR, an FAR of 0.19% and an FRR of 8.24% are obtained. Consequently, an FAR of 0.19% is comparable to an FAR of 1.0% obtained when user authentication is carried out using only one threshold value. With an FAR of 0.19%, an intruder is unlikely to be authenticated. In the case of using a single threshold value, an FRR of about 15.28% is obtained when FAR is 0.19%. However, in the present invention, an FRR of 8.24% is obtained when FAR is 0.19%. Therefore, according to the present invention, the probability of a registered user being falsely rejected decreases considerably.

On the other hand, in the case of using a two-digit password, the probability of an intruder inputting a correct password in a first trial is 1% (=0.01) while the probability of the intruder inputting a wrong password in the first trial is 99% (=0.99). In this case, FRR and FAR can be calculated using Equation (2) below. As shown in Equation (2) below, FAR is lower than the one obtained by Equation (1), which illustrates an enhancement of the performance of the biometrics device.

$$FRR=1.0\times8.24+0.0\times17.41=8.24(\%) \; FAR=0.01\times1.00+0.99\times0.10=0.109(\%) \quad (2)$$

Figure 2:
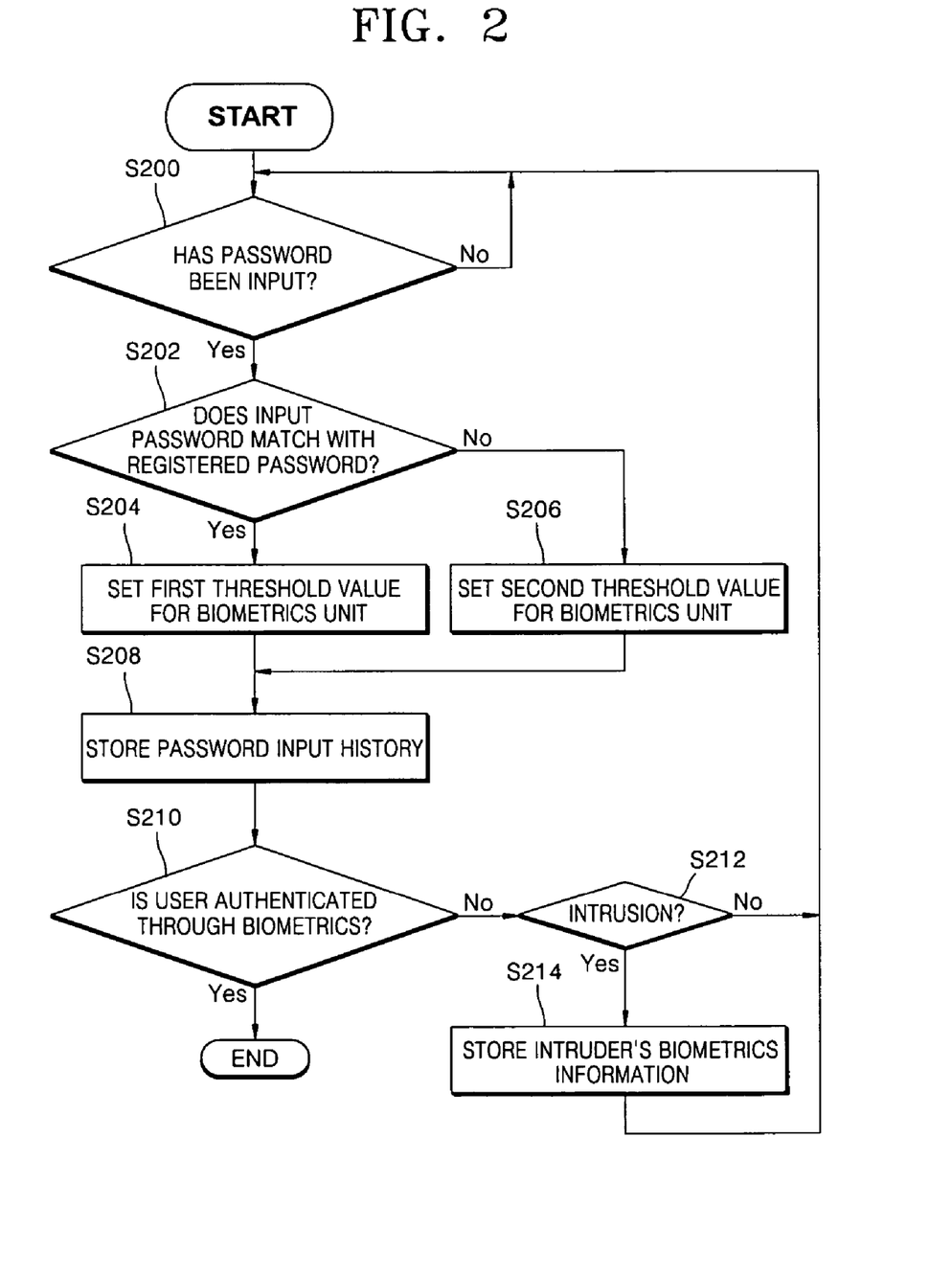
FIG. 2 is a flowchart of a user authentication method according to an embodiment of the present invention.

FIG. 2 is a flowchart of a user authentication method according to another embodiment of the present invention. The user authentication method of FIG. 2 includes all the operations of the user authentication method of FIG. 1. In addition, the user authentication method of FIG. 2 further includes storing a password input history and determining whether there has been an intrusion based on a result of analyzing the password input history. In some cases, a non-registered user or an intruder may attempt to go through an authentication process without knowing about a password, or a registered user may input a wrong password by accident. For example, if, during user authentication through biometrics, a wrong password has been input into a biometrics device n times or more, the biometrics device may determine that there has been an intrusion made. If it is determined that there has been an intrusion, the biometrics device stores an intruder's biometrics information in order to block the intruder's subsequent attempts to be authenticated and then blocks the intruder from being authenticated by referring to the intruder's biometrics information and/or increasing a threshold value for biometrics to its maximum. A detailed description of the user authentication method of FIG. 2 will be presented in the following paragraphs.

Operation S200 repeats continuously until a password has been input.

In operation S202, the input password is compared with a registered password, where a match indicates that a correct password has been entered and no match indicates that an incorrect password has been entered.

In operation S204, if the input password matches with the registered password, a first threshold value is assigned as a threshold value of the biometrics unit so that FRR can be reduced.

In operation S206, if the input password does not match with the registered password, a second threshold value is assigned as a threshold value of the biometrics unit so that FAR can be reduced.

In operation S208, a password input history is stored. For example, whenever a wrong password is input, a value of a predetermined counter may be increased by +1.

In operation S210, the user is authenticated by the biometrics device for which the first and second threshold values have already been set to determine if the user is authorized.

In operation S212, if the user is not authenticated, a determination is made whether there has been an intrusion by referring to the password input history. If there has not been an intrusion, the user authentication method returns to operation S200. On the other hand, if there has been an intrusion, the user authentication method is ended or returns to operation S200 after setting the threshold value for biometrics to its maximum.

Also, if there has been an intrusion, an intruder's biometrics information may be stored. The stored biometrics information could be used for subsequent user authentications using the biometrics device. Therefore, the user authentication method of FIG. 2 may further include operation S214 in which the intruder's biometrics information is stored if it is determined that there has been an intrusion. In this case, in operation S210, whether to authenticate the user also depends on a result of comparing the user's biometrics information with the intruder's biometrics information.

Figure 3:
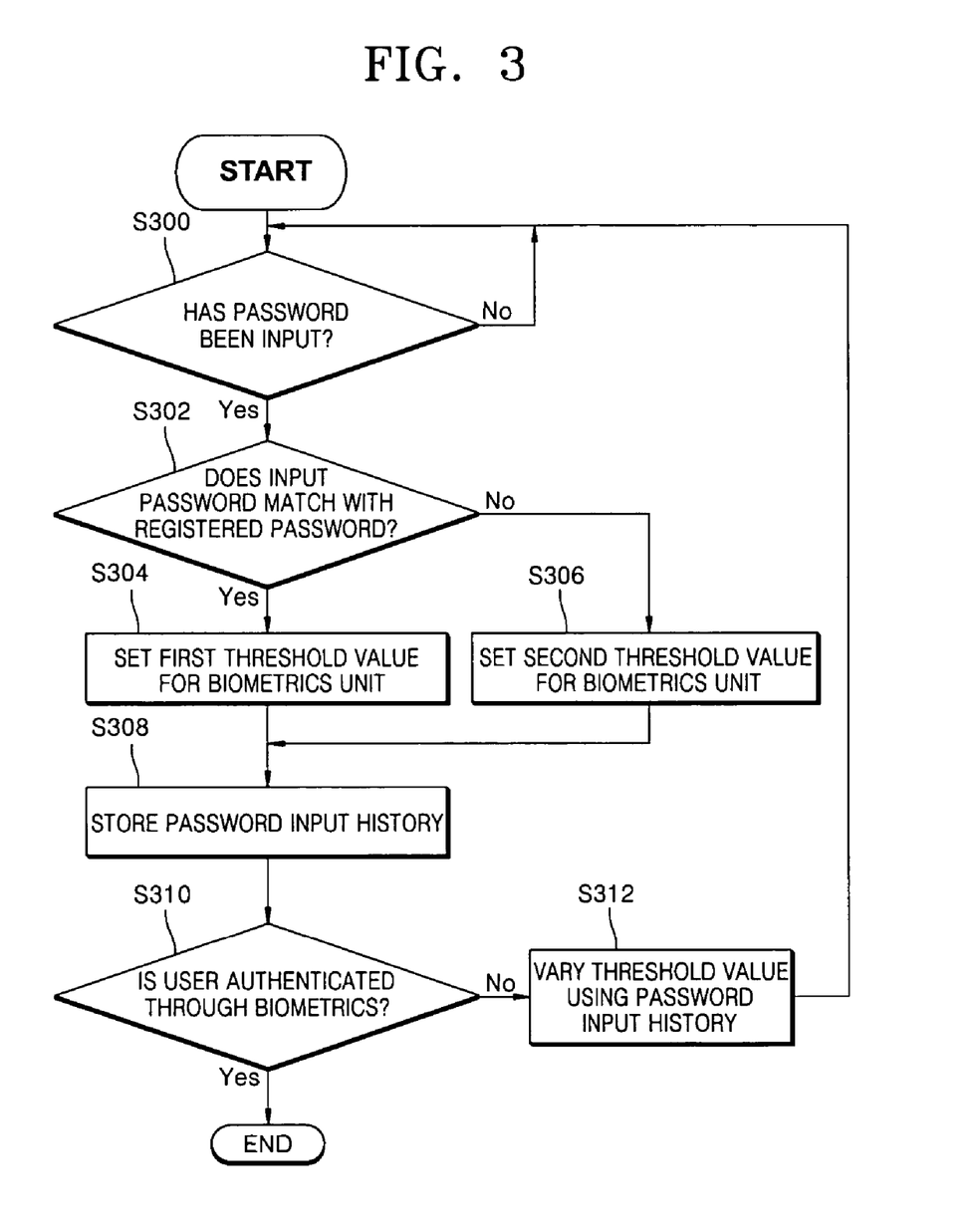
FIG. 3 is a flowchart of a user authentication method according to an embodiment of the present invention.

FIG. 3 is a flowchart of a user authentication method according to another embodiment of the present invention. The user authentication method of FIG. 3 includes all the operations of the user authentication method of FIG. 1. In addition, the user authentication method of FIG. 3 further includes operations in which a password input history is stored and analyzed and a threshold value for biometrics is adjusted according to a result of the analysis. In some cases, a non-registered user or an intruder may attempt to go through an authentication process without knowing about a password, or a registered user may input a wrong password by accident. In those cases, a level of security can be varied by storing a password input history and gradually increasing a threshold value for biometrics if the number of times an incorrect password is input increases. The user authentication method of FIG. 3 will be described in greater detail in the following paragraphs.

Operations S300 through S310 of FIG. 3 are the same as operations S200 through S210 of FIG. 2, and thus their description will not be repeated.

In operation S312, if a user is not authenticated, first and second threshold values are varied by referring to the password input history and the user authentication method returns to operation S300. Operation S312 could be carried out in a manner that varies the first and second threshold values so as to enhance a level of security if an incorrect password has been input at least n times.

In addition, operation S312 may include a process of restoring the varied first and second threshold values to an initial or default setting if a correct password has been input at least m times since the first and second threshold values were varied. By doing so, FRR decreases, and the level of security is lowered.

Hereinafter, an example of a user authentication method in which the threshold value is adjusted by referring to the password input history will be described in greater detail with reference to Table 1.

Let us assume that an incorrect or invalid password has been input three times consecutively during an authentication process. If a correct password is input in a fourth trial, (FAR, FRR)=(0.20%, 15.28%) is applied to Equation (3) below to calculate FRR and FAR. If an incorrect password is input in the fourth trial, (FAR, FRR)=(0.00%, 41.48%) is applied to Equation (3) below.

$$FRR=1.0\times15.28+0.0\times42.48=15.28(\%) \; FAR=0.01\times0.20+0.9\times0.00=0.02(\%) \quad (3)$$

As shown in Equation (3) above, an FAR of 0.02% and an FRR of 15.28% are obtained, when compared to an FAR of 0.19% and an FRR of 8.24%, respectively, obtained by Equation (1) when using two threshold values for biometrics, illustrate that if an invalid password is input three times, the level of security is enhanced.

Figure 4:
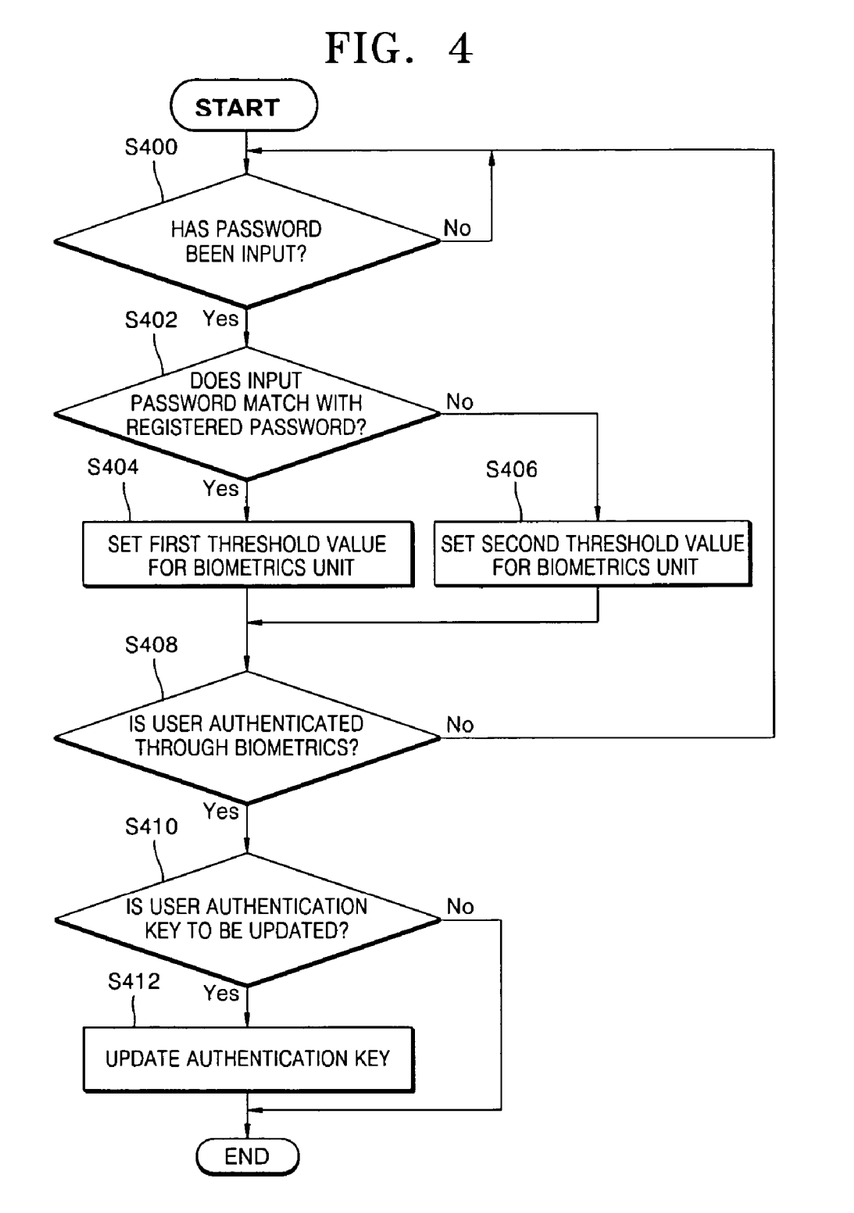
FIG. 4 is a flowchart of a user authentication method according to an embodiment of the present invention.

FIG. 4 is a flowchart of a user authentication method according to another embodiment of the present invention. The user authentication method of FIG. 4 includes all the operations of the user authentication method of FIG. 1. In addition, the user authentication method of FIG. 4 further includes updating an authentication key for biometrics. According to the passage of time, the authentication key may vary in accordance with the variation of a user's preferences on his or her appearance or the effects of aging. Therefore, there is a need to keep the authentication key current and up-to-date. In addition, because the environment in which terminals are used changes, it would be very convenient for a user to register a plurality of authentication keys by adding authentication keys. The user authentication method of FIG. 4 will be described in greater detail in the following paragraphs.

Operations S400 through S408 of FIG. 4 are the same as operations S100 through S108 of FIG. 1, and thus their description will not be repeated here.

In step S410, a determination is made whether to update an authentication key. If the authentication key is automatically updated even when an intruder is successfully authenticated by accident, the intruder automatically has a permanent right to access a terminal, which is clearly against the original purpose of updating the authentication key. Therefore, in operation S410, more severe restrictions need to be placed on the process of updating the authentication key than those imposed on a process of authenticating a user.

One of the restrictions imposed on the process of updating the authentication key is that an input password should match with a registered password and a user should be authenticated by a biometrics device before updating the authentication key.

Another restriction could be imposed on the process of updating the authentication key. That is, the user should be authenticated to the extent to which the user's input biometrics information matches with the registered biometrics information is not less than a third threshold value, in order to add/update the authentication key. The third threshold value is set to a predetermined value that depends on the level of security desired.

Under a circumstance where only one threshold value is used, the probability of an intruder inputting a correct password is 10% (=0.1), and the probability of an authorized person being rejected, i.e., FRR, is 8.24%. Then, the probability of an intruder successfully updating the authentication key, i.e., a false update rate (FUR), can be obtained using Equation (4) below.

$$FUR=0.1\times1.00=0.10\%  \qquad(4)$$

If the authentication key is allowed to be updated only when the user is successfully authenticated satisfying the restriction regarding the third threshold value, it is possible to considerably reduce the probability of updating the authentication key with an intruder's biometric information. For example, in the case of using (FAR, FRR)=(0.01%, 26.25%) as a threshold value for updating the authentication key, the probability of updating the authentication key with an intruder's biometric information can be calculated using Equation (5) below.

$$FUR=0.1\times0.01=0.001\%  \qquad(5)$$

Figure 5:
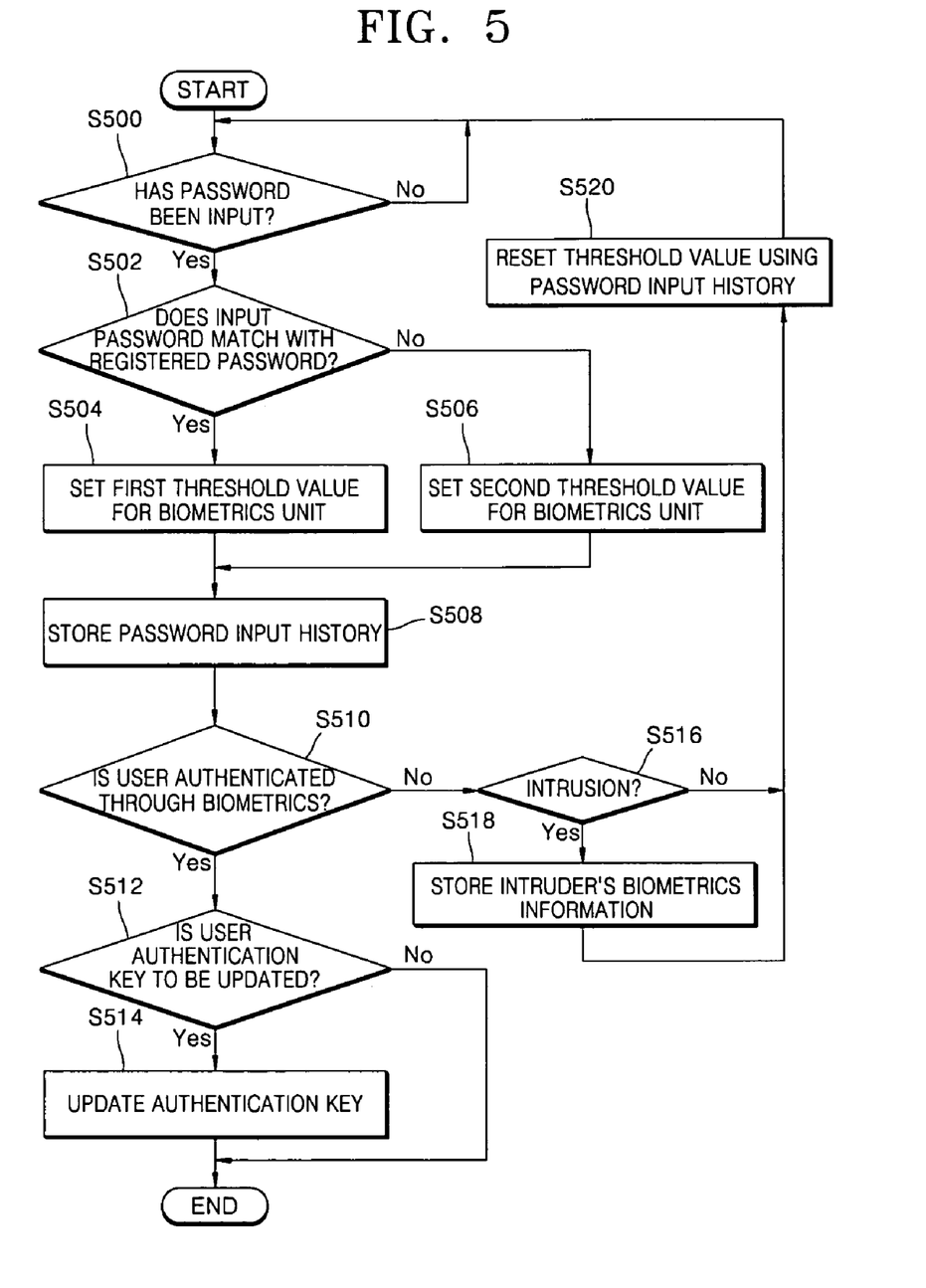
FIG. 5 is a flowchart of a user authentication method according to an embodiment of the present invention.

FIG. 5 is a flowchart of a user authentication method according to another embodiment of the present invention. The user authentication method of FIG. 5 includes all the operations included in each of the user authentication methods of FIGS. 1 through FIGS. 4. Those operations have already been described above with reference to FIGS. 1 through 4, and thus their description will not be repeated here.

Hereinafter, the structure and operation of a user authentication apparatus that can carry out the user authentication methods of FIGS. 1 through 5 will be described in greater detail with reference to FIG. 6.

Figure 6:
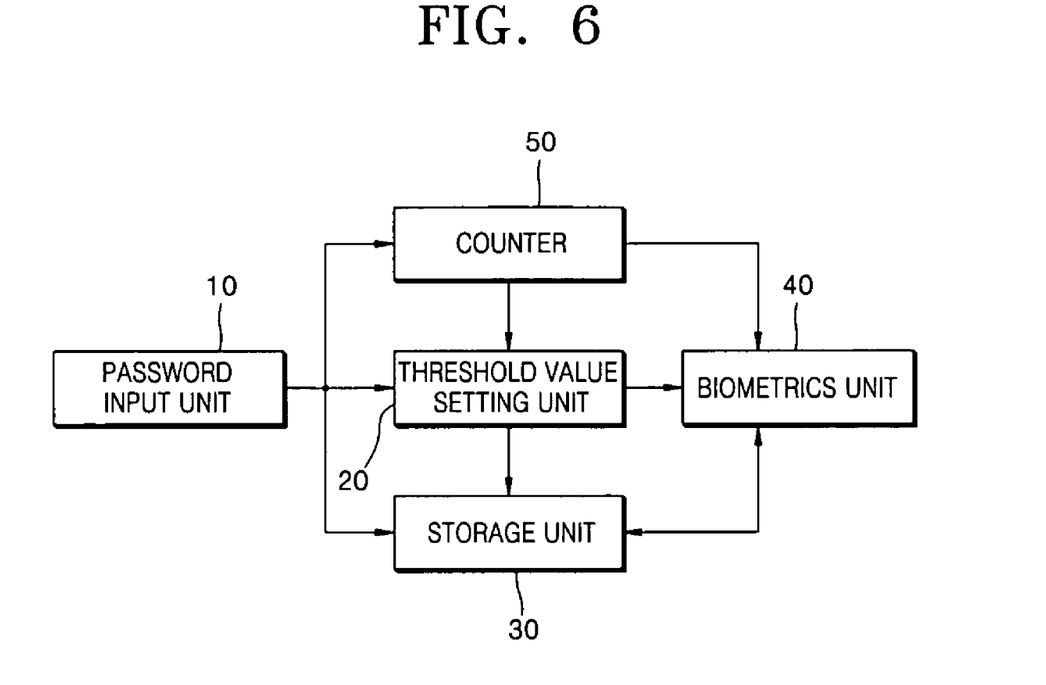
FIG. 6 is a block diagram of a user authentication apparatus according to an embodiment of the present invention.

FIG. 6 is a block diagram of a user authentication apparatus according to an embodiment of the present invention. The user authentication apparatus includes a password input unit 10, a threshold value setting unit 20, a storage unit 30, and a biometrics unit 40. The user authentication apparatus may further include a counter 50.

The user authentication apparatus authenticates a user based on a password input by the user and the user's biometrics information. Here, the password is composed of at least one externally input number or letter, and biometrics information indicates a person's fingerprint, iris, or face, etc.

The password input unit 10 determines whether or not a password has been received. The password input unit 10 compares a password input by a user, which is comprised of at least one number or letter, with a registered password stored in the storage unit 30 and outputs a result of the comparison.

If the input password matches with the registered password, the threshold value setting unit 20 sets a first threshold value to be used in the biometrics unit 40 so that FRR can be reduced. Otherwise, the threshold value setting unit 20 sets a second threshold value so that FAR can be reduced.

The storage unit 30 stores the registered password and registered biometrics information.

The biometrics unit 40 obtains the user's biometrics information via a biometric input device (not shown), compares the obtained biometrics information with the registered biometrics information, determines the extent to which the obtained biometrics information matches with the registered biometrics information depending on a result of the comparison, and authenticates the user if the extent to which the obtained biometrics information matches with the registered biometrics information is larger than a predetermined threshold value.

In operation S208 of FIG. 2, in particular, the storage unit 30 may store a password input history regarding passwords input via the password input unit 10. In addition, in operation S212, the biometrics unit 40 may determine whether or not there has been an intrusion by referring to the password input history. If it is determined that there has been an intrusion, the storage unit 30 stores an intruder's biometrics information. Thereafter, the biometrics unit 40 may determine whether to authenticate the user based on a result of comparing the intruder's biometrics stored in the storage unit 30 with the user's biometrics information to insure that an intruder has not guessed the correct password.

In operation S308 of FIG. 3, the storage unit 30 may also store a password input history regarding passwords input via the password input unit 10. In addition, in operation S312, the threshold value setting unit 20 may vary first and second threshold values using the password input history stored in the storage unit 30 even when the user is not authenticated. More specifically, the threshold value setting unit 20 may vary the first and second threshold values so as to enhance a level of security if an incorrect password is input at least n times. If the correct password, that is an input password that matches the registered password, is input at least m times after the first and second threshold values are varied, the threshold value setting unit 20 may restore the varied first and second threshold values to an initial setting.

In operations S410 and S412 of FIG. 4, the user authentication apparatus may add or update an authentication key if the user is authenticated. In order to add/update the authentication key, the biometrics unit 40 outputs the obtained biometrics, i.e., the user's biometrics information, to the storage unit 30, if the user is authenticated. In order to guarantee reliability of a process of updating the authentication key, the biometrics unit 40 may add/update the authentication key by outputting the obtained biometrics information to the storage unit 30 only when the password input via the password input unit 10 matches with the registered password and the user is authenticated by its standards. In addition, the user authentication apparatus may add/update the authentication key only when the extent to which the obtained biometrics information matches with the registered biometrics information is not less than a third threshold value.

The user authentication apparatus may further include a counter 50 to carry out operation S212 or S312. The counter 50 counts the number of times an incorrect password is input and outputs a result of the counting. Then, the threshold value setting unit 20 may gradually adjust a threshold value based on the result of the counting. In addition, the biometrics unit 40 may determine whether there has been an intrusion and output the obtained biometrics information to the storage unit 30 if there has been an intrusion. Then, the storage unit 30 may store the user's biometrics information received from the biometrics unit 40.

The user authentication methods of FIGS. 1 through 5 can be written into computer-executable programs and can be realized in a common digital computer with the help of a computer-readable recording medium. The computer-readable recording medium includes a ROM, magnetic storage medium, such as a floppy disk, or a hard disk, an optical storage medium, such as CD-ROM or a DVD, and a carrier wave, such as data transmission through the Internet.

As described above, according to the present invention, both FAR and FRR may be reduced by reflecting a result of password authentication into the performance of a biometrics device or making a feedback of result of biometrics so as to affect a subsequent authentication process.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A user authentication method that authenticates a user based on a password input by the user and the user's biometrics information, the user authentication method comprising:
    determining whether a password has been input;
    setting a first threshold value if the input password matches with a registered password and setting a second threshold value if the input password does not match with the registered password; and
    determining whether to authenticate the user based on a comparison of the user's biometrics information with registered biometrics information and the first or second threshold value.

2. The user authentication method of claim 1, wherein the first threshold value is set so that a false rejection rate (FRR) is reduced and the second threshold value is set so that a false acceptance rate (FAR) is reduced.

3. The user authentication method of claim 1, further comprising:
    storing a password input history; and
    determining whether there has been an intrusion, by referring to the password input history if the user is not authenticated.

4. The user authentication method of claim 3, further comprising:
    storing an intruder's biometrics information upon determining that there has been an intrusion,
    wherein the determining whether there has been an intrusion, comprises authenticating the user based on a result of comparing the user's biometrics information with the intruder's biometrics information.

5. The user authentication method of claim 1, further comprising:
    storing a password input history; and
    varying the first and second threshold values based on the password input history if the user is not authenticated.

6. The user authentication method of claim 5, wherein the varying the first and second threshold values, comprises varying the first and second threshold values so as to enhance a level of security if a wrong password is input at least n times.

7. The user authentication method of claim 6, wherein the varying the first and second threshold values, comprises restoring the varied first and second threshold values if a correct password is input at least m times after the first and second threshold values are varied so as to enhance the level of security.

8. The user authentication method of claim 1, further comprising:
    adding/updating an authentication key if the user is authenticated.

9. The user authentication method of claim 8, wherein the adding/updating the authentication key, comprises adding/updating the authentication key if the input password matches with the registered password and the user is authenticated by a biometrics unit.

10. The user authentication method of claim 8, wherein the adding/updating the authentication key, comprises adding/updating the authentication key if the user is authenticated by the biometrics unit and the extent to which the input password matches with the registered password is larger than a predetermined third threshold value.

11. A user authentication apparatus that authenticates a user based on a password input by the user and the user's biometrics information, the user authentication apparatus comprising:
    a password input unit which determines whether a password has been input;
    a storage unit which stores a registered password and registered biometrics information;
    a threshold value setting unit which sets a first threshold value if the input password matches with a registered password and sets a second threshold value if the input password does not match with the registered password; and
    a biometrics unit which obtains biometrics information from the user outside, determines how much the obtained biometrics information matches with the registered biometrics information, and authenticates a user if the extent to which the obtained biometrics information matches with the registered biometrics information is larger than the first or second threshold value.

12. The user authentication apparatus of claim 11, wherein the first threshold value is set so that a false rejection rate (FRR) is reduced and the second threshold value is set so that a false acceptance rate (FAR) is reduced.

13. The user authentication apparatus of claim 11, wherein the storage unit stores a password input history, and the biometrics unit determines whether there has been an intrusion by referring to the password input history stored in the storage unit if the user is not authenticated.

14. The user authentication apparatus of claim 13, wherein the storage unit stores an intruder's biometrics information if determined that there has been an intrusion, and the biometrics unit authenticates the user based on a result of comparing the obtained biometrics information with the intruder's biometrics information.

15. The user authentication apparatus of claim 11, wherein the storage unit stores a password input history, and the threshold value setting unit varies the first and second threshold values based on the password input history if the user is not authenticated.

16. The user authentication apparatus of claim 15, wherein the threshold value setting unit varies the first and second threshold values so that a level of security is enhanced, if an incorrect password is input n times or more.

17. The user authentication apparatus of claim 16, wherein the threshold value setting unit restores the varied first and second threshold values if a correct password is input m times or more.

18. The user authentication apparatus of claim 11, wherein an authentication key is added or updated if the user is authenticated.

19. The user authentication apparatus of claim 18, wherein the authentication key is added or updated if the input password matches with the registered password and the user is authenticated by the biometrics unit.

20. The user authentication apparatus of claim 18, wherein the authentication key is added or updated if the user is authenticated by the biometrics unit and the extent to which the obtained biometrics information matches with the registered biometrics information is larger than a predetermined third threshold value.

21. The user authentication apparatus of claim 11, further comprising:
a counter which counts the number of times an incorrect password is input and outputs a result of the counting,
wherein the threshold value setting unit varies the first or second threshold value depending on the result of the counting.

22. The user authentication apparatus of claim 11, further comprising:
a counter which counts the number of times an incorrect password is input and outputs a result of the counting,
wherein the storage unit stores the obtained biometrics information output from the biometrics unit depending on the result of the counting.

23. A computer-readable recording medium on which a program enabling the user authentication method of claim 1 is recorded.

24. A user authentication method, comprising:
adjusting a threshold level of a biometrics device which reads a user's biometric information based on a password input by a user, wherein the threshold level is broadened when the user inputs a valid password to increase the possibility of the user being authenticated by the biometrics device, and the threshold level is narrowed when the user inputs an invalid password to decrease the possibility of the user being authenticated by the biometrics device.

25. The method of claim 24, further comprising:
comparing the user input password with a predetermined password, wherein when the user input password is valid, the user input password matches the predetermined password, a first threshold level which reduces a false rejection rate is set, and when the user input password is invalid, the user input password does not match the predetermined password, a second threshold level which reduces a false acceptance rate is set.

26. The method of claim 24, wherein the threshold level is adjusted to incrementally reduce the possibility of the user being authenticated by the biometrics device as a number of invalid password entries by the user increases.

27. The method of claim 26, further comprising:
storing the user's biometric information as an intruder biometric entry when the number of invalid password entries by the user equals a predetermined number.

28. The method of claim 27, further comprising:
comparing a subsequent user's biometric information with the intruder biometric entry, wherein when the subsequent user's biometric information matches the intruder biometric entry based on the threshold level set, the subsequent user is blocked from being authenticated.

29. The method of claim 26, further comprising:
storing the password input by the user as a password history; and
storing the user's biometric information as an intruder biometric entry based on the password history.

30. The method of claim 29, further comprising:
comparing a subsequent user's biometric information with the intruder biometric entry, wherein when the subsequent user's biometric information matches the intruder biometric entry based on the threshold level set, the subsequent user is blocked from being authenticated.

31. The method of claim 24, further comprising:
storing a biometric authentication key which corresponds to an authorized user's biometric information; and
updating the authentication key when the password is valid.

32. The method of claim 31, wherein the updating the authentication key occurs only when the password is valid and the level which the user's biometric information matches the authorized user's biometric information exceeds an updating authentication threshold.

* * * * *